Oct. 19, 1943.  J. H. VAN ZANDT  2,331,875
HEATING SYSTEM
Filed Dec. 11, 1939  5 Sheets-Sheet 1
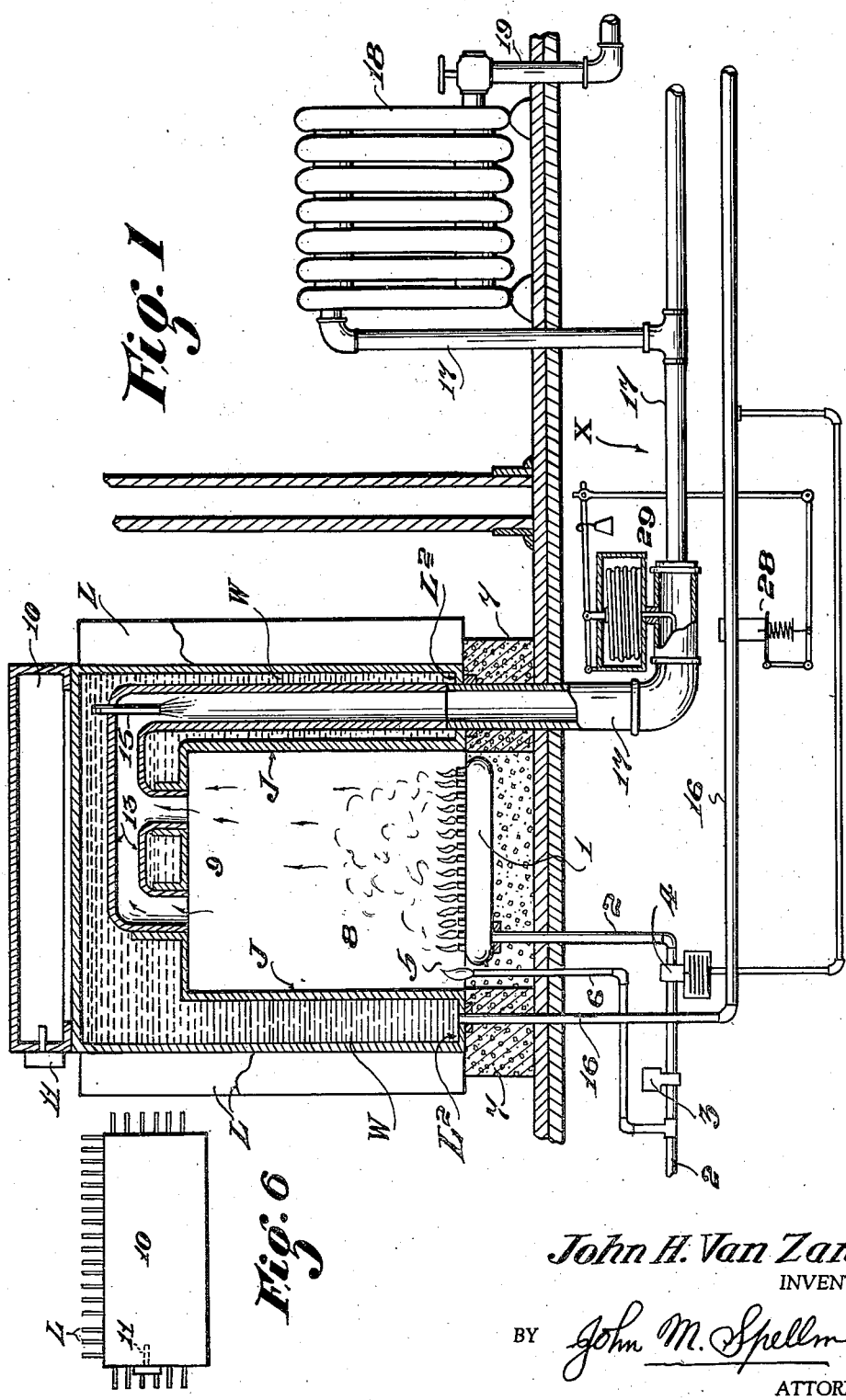
John H. Van Zandt
INVENTOR.
BY John M. Spellman
ATTORNEY.

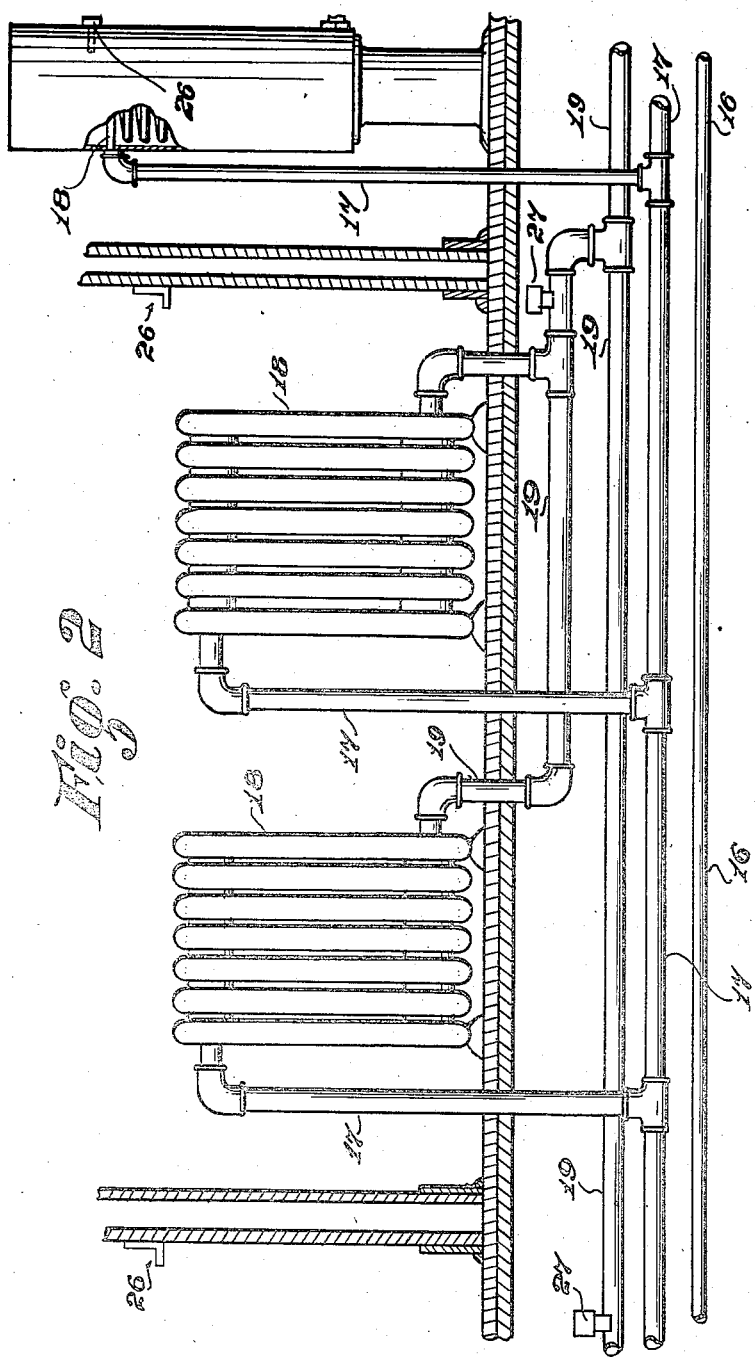

Oct. 19, 1943.  J. H. VAN ZANDT  2,331,875
HEATING SYSTEM
Filed Dec. 11, 1939  5 Sheets-Sheet 3
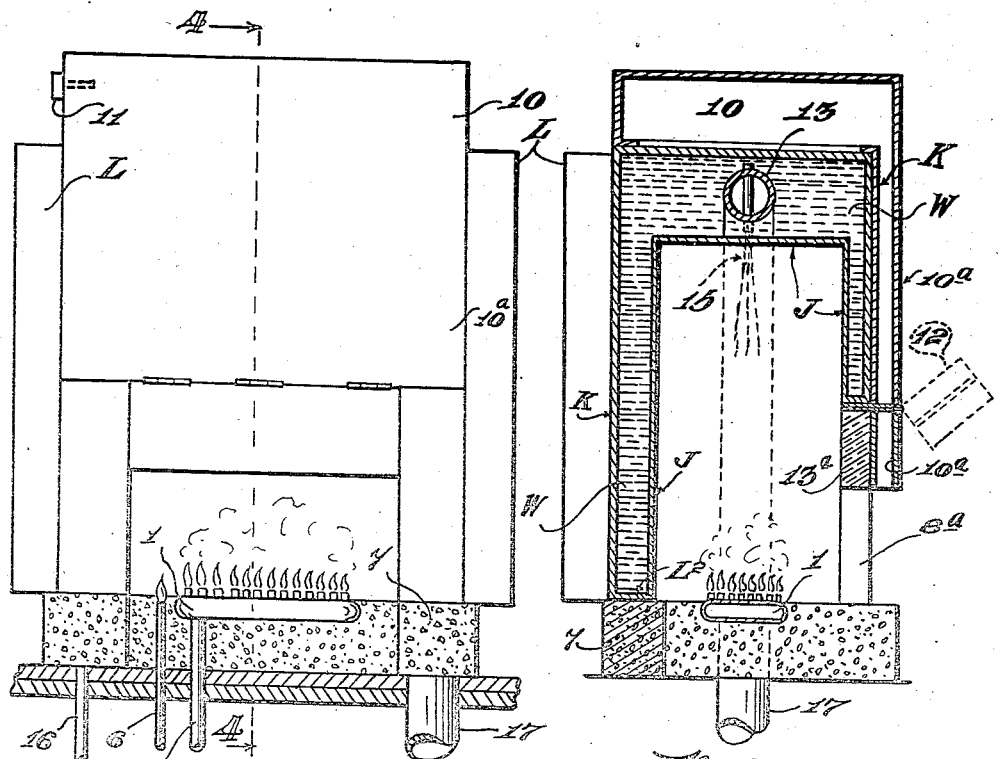
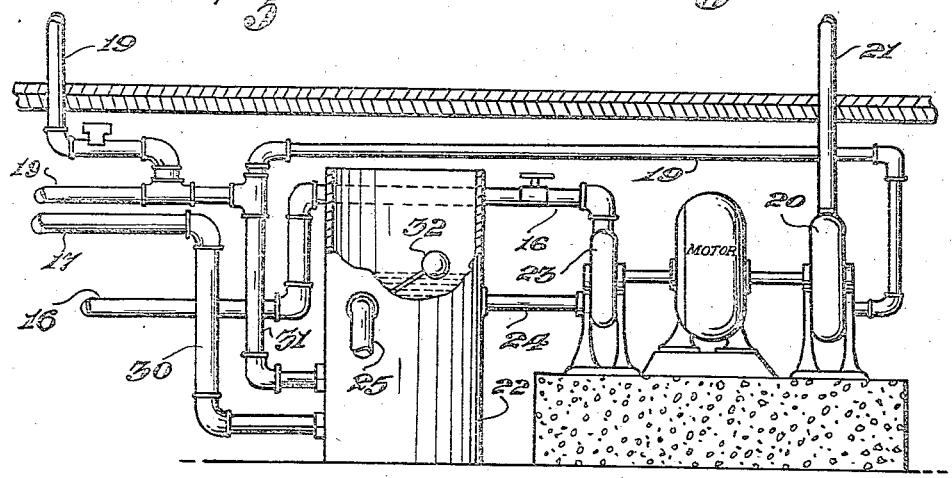
John H. Van Zandt
INVENTOR.
BY John M. Spellman
ATTORNEY.

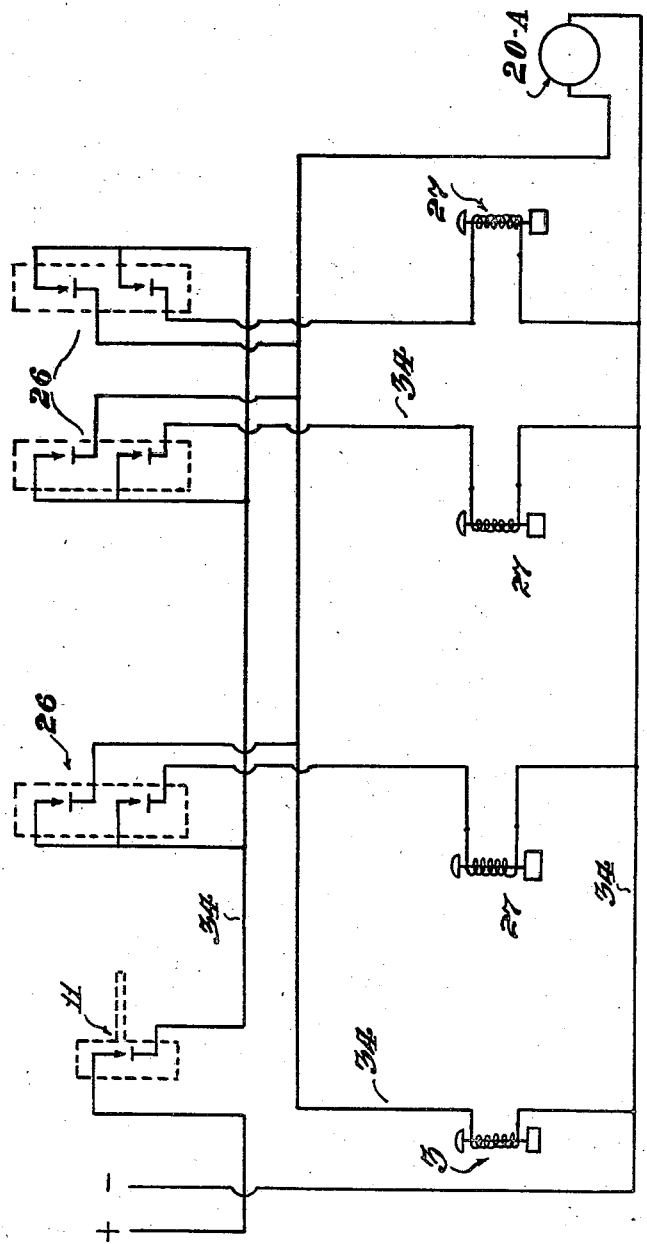

Oct. 19, 1943.   J. H. VAN ZANDT   2,331,875
HEATING SYSTEM
Filed Dec. 11, 1939   5 Sheets-Sheet 5

John H. Van Zandt
INVENTOR.

BY John M. Spellman
ATTORNEY.

Patented Oct. 19, 1943

2,331,875

UNITED STATES PATENT OFFICE 2,331,875

HEATING SYSTEM

John H. Van Zandt, Dallas, Tex.

Application December 11, 1939, Serial No. 308,582

37 Claims. (Cl. 237—9)

This invention relates to a new and improved apparatus and method for the production and utilization of a heating medium for use in various industrial processes and for heating buildings, dwellings and the like, and in such connection it relates more particularly to the novel construction and arrangement of the parts thereof and the method of carrying out such production and utilization.

In accordance with my invention fuel may be burned in open exposure to a space requiring heat, in a combustion zone situated within such space, and the gases of combustion then are so temperature conditioned as to permit of their being safely conveyed thence through the building structure to more remote sections and there used in radiators or the like for heating purposes. When such gases may have thus been drained of their heat they are then evacuated from the building through conduits to obviate the contamination of the air of the spaces so heated. Such a method results in the saving of a large proportion of the fuel which, otherwise, would be required for an equal measure of heat service, produces much more equitable temperature in such heated quarters and preserves the chemical purity of the air enclosed within the heated space.

Prevailing methods of house heating include isolated stoves or heaters having smoke or vent stacks by which much of the heat of combustion is wasted; isolated non-vented stoves in which gaseous fuels are burned and the products of combustion are there released, resulting in the chemical contamination of the air of the living space; and central heating plants in which the heat from a single fire is partially used to create a heating medium which transports heat to radiating means remotely situated, and the remainder, constituting a large proportion, is wasted through the flue with the combustion gases.

In contrast, by the method here proposed it is possible to utilize for heating practically all of the heat derived from combustion, to avoid combustion gas contamination of the spaces heated and govern or control the generation and distribution of heat in a more precise manner than is otherwise possible.

Likewise, this invention relates to a new method involving the generation of a heating medium composed of combustion gases and water vapor and the selective service of such a medium to the heat disseminator appointments of one or another of a multiplicity of enclosed spaces in accordance with the particular heat requirement of each such space.

The invention also relates to the control of the temperature of such heating medium composed of combustion gases and water vapor, in accordance with the requirements of the particular service to which such heating medium is adapted.

Preliminary to a thorough understanding of the invention it may be stated that it is desirable in the interest of economy and operability to derive a heating medium susceptible of conduit transportation to remote points for utilization, more efficient than is obtainable where fuels are burned in furnaces and a fraction only of the resultant heat is absorbed through conducting walls by a heating medium or is used locally, and the remainder is evacuated through a breeching and smoke-stack, and to utilize such a medium to the limit of its potential serviceability.

The temperature characteristics required of a heating medium will vary with its particular application. In laundry work and in certain industrial processes temperatures considerably in excess of the temperature of steam at atmospheric pressure (at sea level) are indicated while appreciably lower temperatures are better adaptable to house heating. When fluid fuels such as petroleum, gasoline, alcohol, fuel gas, etc., are combined by combustion in correct proportion with air, an approximately perfect combustion may be effected. The temperatures of the products resulting from such a process will range upward or downward from about 1800° F. depending upon the ratio of the constituent elements, carbon and hydrogen, of the particular fuel.

If a mixture of the correct proportions of fuel and air are burned within a furnace and if the resulting products of combustion are trapped and led into an adjoining chamber or flue and are there exposed to water spray, a mixture of gases having lower temperatures will result. If such an amount of water were sprayed into the stream of such gases as would appropriate and convert into latent heat of evaporation all of the sensible heat thereof in excess of 212°, an approximately saturated mixture of 212° temperature would result. But if some fraction only of the amount of water spray necessary to effect such approximate saturation were introduced, it is apparent that the temperature of the resulting mixture would range accordingly between 212° and combustion temperature. From such a premise it follows that electability of temperature of a heating medium composed of products of combustion and water vapor may be had by elective control of the amount of water sprayed into the stream of products of combustion. One object of this invention is to provide means whereby this function may be performed automatically.

In both household and industrial heating economics there are frequently separate heat requirements which do not run parallel to one another. A facility for the service of the one requirement or the other or for the two or more at one time according to the incidence of such separate needs is, therefore, indicated. An improved method and means for such selective service are among the objects of this invention.

In house heating there is a predilection on the part of a considerable number of individuals for the dissipation of a modicum of radiant heat as contrasted with convected heat. By providing a fuel burning space as herein disclosed with an aperture adapted to the dissemination of radiant heat therethrough from the fire and the location of such heat producing facility within one of the spaces which it is proposed to heat, not only will the above desideratum be derived but the ends of economy will be served by the reduction in capacity of other heat disseminating means required.

Accordingly, among the principal objects of this invention are to provide a heating means of extreme efficiency and facility for utilization; to afford means for the selective service of a multiplicity of isolated heat requirements of electably diverse and variable proportion from a common source; to provide a heating service of electably variable superheat content, free from the pressure hazards and provision cost, characterizing current use of steam under pressures consonant with such required temperature; to afford a heating service adaptable to utilization at the source of its production of an electable proportion thereof and to distribution to and utilization in remotely situated disseminating facilities of the remainder.

Other objects of the invention will become apparent from a perusal of the following detailed description, taken in connection with the accompanying drawings, and in the drawings:

Figure 1 is a vertical sectional view through the preferred form of the heat producing source embodying a burner, a combustion space, a gas trapping chamber, a cowl, water space, a heat disseminating unit, and connecting into a conduit circuit;

Figure 2 is an elevational view, showing a continuation of the heat disseminating units and the conduit circuits or systems;

Figure 3 is a front elevational view of the furnace coacting parts, the circulating systems or circulating means being broken away;

Figure 4 is a transverse vertical sectional view of Figure 3, the view being had on the line 4—4 of said figure;

Figure 5 is an elevational view of a water receptacle, motor, water pump and fan means, showing their preferred connection with the conduit systems, the latter being broken away;

Figure 6 is a top plan view on a reduced scale of the cowl, showing the fins connecting to the exterior wall of members enclosing combustion and gas trapping spaces;

Figure 7 is an electrical circuit, showing diagrammatically the parts operated thereby;

Figures 8, 9:
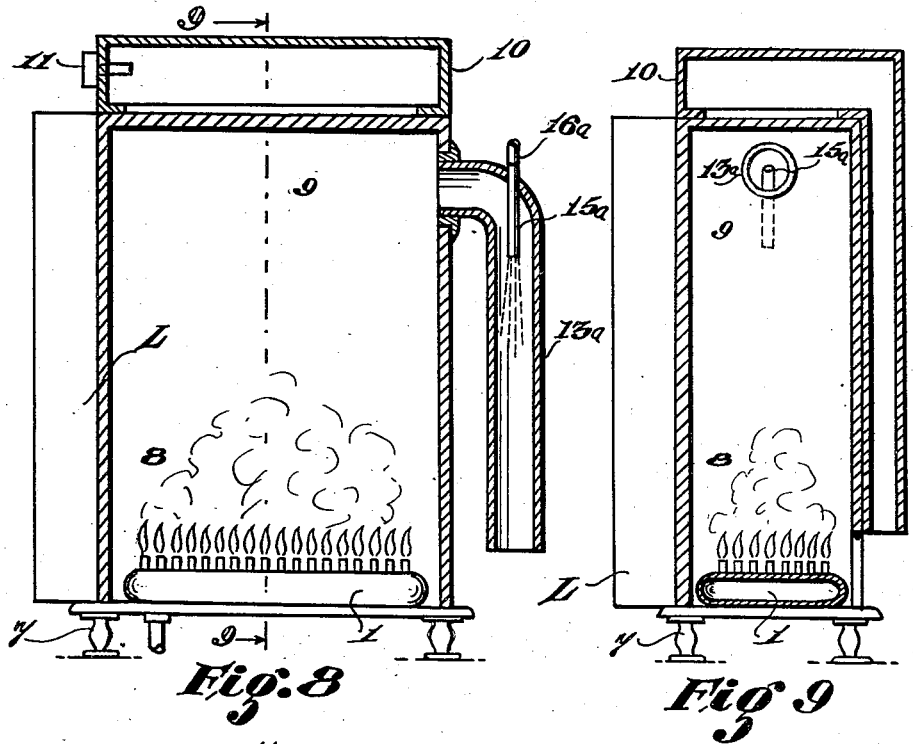
Figure 8 is a vertical section of a variation of the furnace having solid walls and without aperture for the dissipating of radiant heat from combustion.
Figure 9 is a transverse section of the same design as shown in Figure 8 on line 9—9.

In accordance with the drawings there is provided a fuel burner 1 adapted to the burning of fuel under atmospheric conditions, such term being a measure of ability of the burner to sustain combustion when served with fuel under such pressure only as is employed at the fuel source and by air at atmospheric pressure and motivated only by the heat of combustion. The burner is connected to a fuel service line 2 in which is located an electrically operated fuel supply valve 3 and a water pressure actuated fuel supply valve 4. A pilot light 5 is served through a pilot supply line 6 communicating with fuel supply in the fuel line 2. A furnace or combustion space 8 is suspended on the support 7. Above the combustion space is an alcove or gas trapping chamber 9 adapted to trapping the upwardly buoyed products of combustion. An outer cowl 10, resting upon the structure composing the furnace and alcove contains an air space above the alcove, this cowl having an outwardly and downwardly extending portion 10—a, capable of trapping such products of combustion as may overflow from the alcove. The cowl carries in its upper chamber a heat actuable means 11 for stopping the operation of a fan and pump (hereinafter described) and for closing the fuel valve 3. The structure includes an articulating door 12, having its inner part formed of refractory material 13—a and its outer part comprising a continuation of the downwardly extending portion 10—a and when in open position adapted to increase the furnace aperture 8—a and reduce the alcove or gas trapping chamber capacity.

The combustion space and the alcove or gas trapping chamber referred to above are preferably formed by the inner side walls of a water container or water space W. The water container or water jacket consists of inner walls J and outer walls K, bottom L². The cowl 10 rests upon the top member K of the water space. The inner walls J also provide the furnace space referred to. The upper portions of the inner walls J are so formed as to provide openings for the escape of the gaseous products which pass outwardly through a flue 13, the longer part of which serves to conduct the products outwardly into the conduits hereinafter referred to. In these openings in the upper portions of the inner walls J the flue 13 is secured by welding or otherwise. The water container or water jacket is thus capable of retaining water under pressure entering the container through the pipe 16.

For the purpose of utilizing radiated heat from the exterior of the apparatus at the point of production, the outer walls of the combustion and gas trapping chamber are provided with spaced fins L attached thereto.

Disposed in the flue 13 and forming an open connection or communication between the water space or water container and the flue outlet is a water spray jet tube or nozzle 15 adapted to void water from the water space and to discharge same in the flue 13 in the direction of the flow of the gas from the alcove or gases trapping chamber 9 toward a conduit distributing system 17. An operable water pump 23 (Fig. 5) connected by conduit 24 so as to take water from water receptacle 22 and discharge it under pressure through a connected force system composed of conduit 16, water space W and jet tube 15 into conduit 13 leading outwardly from the gas trapping chamber 9 is adapted to the application of inductive and propulsive force to products of combustion and to reducing the temperature of such gases by conversion of some of their sensible heat into latent heat by the evaporation of some of such water. A gas conduit system connected to conduit 13 and comprising connected distributing conduits 17, heat disseminator means 18, gas evacuating conduits 19, force fan means 20 and evacuating conduit 21, is adapted to conduct the heating medium composed of products of combustion and water vapor from conduit 13 into heat disseminator 18, to dissipate heat therefrom and to evacuate the unappropriated part of such gas mixture. Since force fan 20 (Fig. 5) is adaptable to applying both inductive and propulsive force, it is apparent that its location in the evacuative system as shown is a matter of convenience and that it is adaptable to location at any point within the main distributive conduit such as at point X. Such force as fan 20 applies is designed to supplement that applied by the water driven through jet nozzle 15. The water receptacle 22 is connected to a water supply line 25 and is capacitated to maintain a water level in such tank by means of an admission control valve 32. The apparatus includes thermostats 26 (Figs. 2 and 7), each capacitated to actuate the pump, 23, a force fan 20, fuel valve 3 and that solenoid or other electrically operable valve 27 connected in parallel therewith.

The apparatus includes also a water throttle valve 28 (Fig. 1) which is actuated by the heat in the conduit 17 as articulated and imparted by an adjustable tension thermostatic means 29 connected therewith and adapted to controlling the quantity of water sprayed through jet 15 into the stream of the products of combustion, in response to the temperature effect of such spray upon such products as evidenced in the resulting gas mixture. A drip line 30 is adapted to draining water from the conduit system 17 into the water receptacle 22, also a drip line 31 is provided for draining water from the conduit system 19 into the receptacle 22.

Since the gas distributive system comprising conduits, disseminators and exhausting means, constitutes a flue for the voiding of the products of combustion, it is apparent that open passageway throughout its length is a prerequisite to plant operation. In instances where more than one heat disseminator is employed, it is apparent that each disseminator or each group of disseminators having a common section of supply or exhaust conduit, constitutes a parallel communicating passage and that for the purpose of sustaining operation, an open passageway through only one such parallel route is required. By synchronization of a thermostat 26 responsive to the heat effect of each such disseminator or group thereof, with a solenoid or other electrically actuable valve means 27 located within the conduit circuit thereof, it is possible to maintain plant operation for the service of one or more such circuits in accordance with their respective heat requirements.

In Figure 7, thermostats 26 and electrically operable valves 27 and 3 and motor 20—a, driving fan 20 and the pump 23, are shown diagrammatically connected through an electric conductor system 34. When lowering temperature at any such thermostat 26 closes the contact thereof (here illustrated as a double contact) electric current flows through one contact thereof and conductor 34 to valve 27, connected in series therewith, and through the other or parallel contact and conductor 34, to the motor 20—a operating the fan 20 and the pump 23 and to electrically operable fuel valve 3, thus simultaneously opening valve 27 in series therewith, and valve 3 and operating the motor 20—a to drive the fan 20 and the pump 23. When rising temperature breaks the double contact of such thermostat 26, the power effecting each such process is arrested. In this manner the process of producing and circulating a heating medium composed of products of combustion and water vapor and passing same through one or the other of a plurality of parallel heat dissemanating means may be affected in accordance with the electable heat requirements of each of the several spaces in which such heat disseminating means are located. When rising temperature in the cowl 10 breaks the contact in the electrically operable switch 11, the service of the electric power through the conductor 34 to all the thermostats 26, the electrically operable valves 27 and 3 and to the motor 20—a driving the fan 20 and the pump 23 is discontinued.

In those adaptations in which it is proposed to dissipate heat from the furnace for service in the space in which it is located, it is apparent that in addition to such heat as may emanate from the fire as radiant heat there will be additional heat emitted from the exterior surfaces thereof, in part in the form of radiant heat and in part as convected heat. Since calculability of heat requirement and proportionability of supply in satisfaction thereof are of the essence of the art of heating, it is implicit that such exterior surface is subject to such treatment as will effect either the quantity or the properties or both of the heat emitted therefrom, whether that treatment consist on the one hand of restriction by means of insulation, or enlargement by means of surface increase effected by distortion of wall members of the projection of convector fins, such as depicted at L in the drawings.

Figures 10, 11:
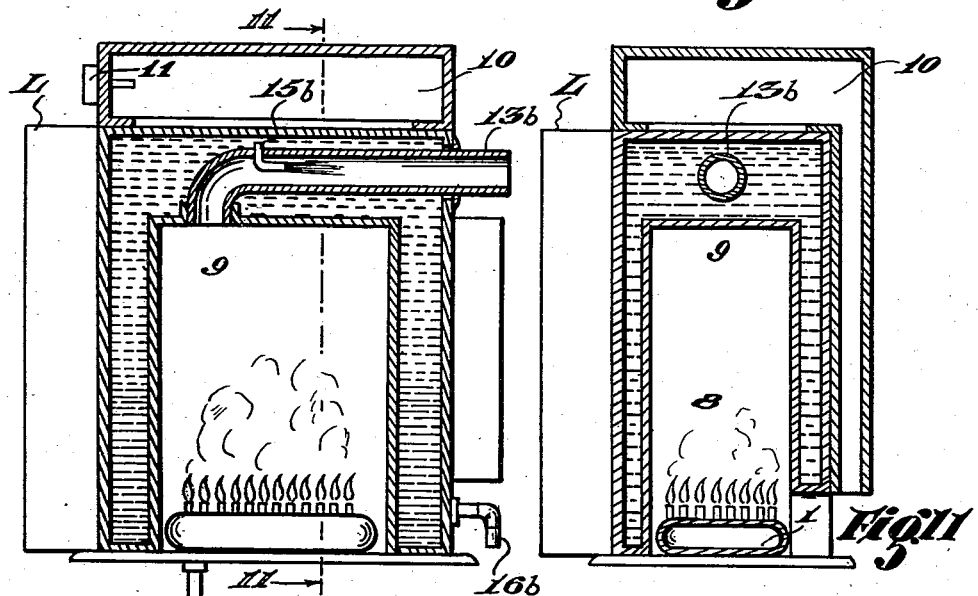
Figure 10 is a vertical section of a variation of the furnace having a water jacket.
Figure 11 is a transverse section of the same design as shown in Figure 10 on line 11—11.

The invention is susceptible of variations, such for example as are shown in Figures 8 to 11 inclusive and in these forms the products of combustion are led by a conduit 13—a, Figures 8 and 9, and a conduit 13—b in Figures 10 and 11 directly from gas trapping chamber 9. In the modified forms shown in Figures 8 and 9 no water jacket or water container is required, and the jet tube 15—a projecting therethrough is connected to pump discharge line 16—a. In Figures 10 and 11 the water may be put under pressure in exposure to heat as before through the pipe 16—b.

The modified form in Figures 10 and 11 includes a conduit 13—b and is generally similar to Figure 6 except that the aperture for the radiation of radiant heat from combustion is reduced to approximately zero. The modified forms in Figures 8 to 11, however, include the cowl 10 with its downwardly projecting part 10—a.

It is implicit that the burner fuel supply and the pilot fuel supply may be put under pilot light actuated thermostatic control of any of the conventional types to the end that extinguishment of the pilot light will result in stopping the fuel service to one or both as may be desired.

It is also implied that the fuel and water supply controls shown may be supplemented by additional manually operable control valves as desired.

Though no insulating material is indicated in the drawings in connection with the furnace or with the gas conductors, it is implicit that such may be applied where and as the exigencies of the particular setting or adaptation may indicate its use.

It is to be understood that the apparatus and method may be modified to an extent which would be within the claims.

I claim:

1. A heating apparatus comprising a fuel supply conduit; a fuel burner connected thereto and adapted to burning fuel under atmospheric conditions; a gas trapping chamber means overhanging such burner and so disposed as to trap the upwardly buoyed products of combustion therefrom; a gas conduit tube connected to such chamber; a jet nozzle therein; a heat disseminator means; a conduit means leading from such gas conduit tube and connecting with such heat disseminator means; a conduit means leading from the lower parts of the enclosure of disseminator means and constituting means for evacuating such products of combustion; a receptacle containing water; a conduit means suitable for dripping water from low points of such distributive and evacuative means and connecting with such water receptacle at an appropriate distance below water level therein; an operable water pump; a conduit connecting the suction of such pump with such receptacle; a conduit connecting the discharge of such pump with said jet nozzle located in the gas conduit tube leading outward from the gas trapping chamber means and adaptable by discharge of water therethrough, to the application of inductive and propulsive force to the products of combustion and to their temperature reduction by conversion of a part of their sensible heat into latent heat of evaporation.

2. A heating apparatus comprising a fuel supply conduit; a fuel burner connected thereto and adapted to burning fuel under atmospheric conditions; a gas trapping chamber means overhanging such burner and adapted to trapping the upwardly buoyed products of such combustion; a gas conduit tube connected to such chamber; a jet nozzle therein; an enclosed water space surrounding said combustion and gas trapping spaces adapted to holding water under pressure in exposure to the heat of such combustion; a heat disseminator means; a distributive conduit means leading from such gas conduit tube and connecting with such heat disseminator means; an evacuative conduit means leading from the enclosure of disseminator means and constituting means for the evacuation of products of combustion; a receptacle containing water; a conduit means suitable for dripping water from low points of such distributive and evacuative conduit means and connecting with the water receptacle at an appropriate distance below water level therein; an operable water pump; a conduit connecting the suction of such pump with such receptacle; a conduit means connecting the discharge of such pump with the said water space surrounding furnace and gas trapping chamber; a conduit means connecting said water space with said jet nozzle in said gas conduit leading outward from such gas trapping chamber and adapted to the application of inductive and propulsive force to such trapped products of combustion and to their temperature reduction by conversion of some of the sensible heat thereof into latent heat of evaporation of water by means of passage of heat-laden water under pressure therethrough.

3. A heating apparatus comprising a fuel supply conduit; a fuel burner connected thereto and adapted to burning fuel under atmospheric conditions; a gas trapping chamber means overhanging such burner and so disposed as to trap the upwardly buoyed products of combustion therefrom; a gas conduit tube connected to such chamber; a jet nozzle therein; a heat disseminator means; a distributive conduit means leading from such gas conduit tube and connecting with such heat disseminator means; a conduit means leading from the lower part of the enclosure of each such disseminator means and constituting means for evacuating such products of combustion; a receptacle containing water; a conduit means suitable for dripping water from such distributive and evacuative conduit means and connecting with such water receptacle; an operable water pump; a conduit means connecting the suction of such pump with such water receptacle; a conduit connecting the discharge of such pump with said jet nozzle located in the gas conduit tube leading outward from the gas trapping chamber and adaptable by discharge of water therethrough to the application of inductive or propulsive force to such products of combustion and to their temperature reduction by conversion of a part of their sensible heat into latent heat of evaporation; an operable forcing fan means connected to conduit system comprising and distributive and evacuative conduit means, and adapted to imparting inductive and propulsive force to the gases moving through such connected system; an electrically operable fuel valve located in such fuel supply conduit; a pilot light means comprising a pilot light burner and a pilot light service conduit connecting such pilot light burner with such fuel supply conduit between such electrically operable fuel valve and the source of fuel; and a thermostat or other thermally operable means so located as to be affected by the heat dissipated by such heat disseminator means and capacitated to close such electrically operable fuel valve and stop such operable water pump and fan means when the temperature at such points attains to an elected level and to open such valve and operate such water pump and fan means when the temperature at such point drops to an elected level; and a power conductor means suitable for the integration of such electrically operable valve, pump and fan means.

4. A heating apparatus comprising a fuel supply conduit; a fuel burner connected thereto and adapted to burning fuel under atmospheric conditions; a gas trapping chamber means overhanging such burner and adapted to trapping the upwardly buoyed products of such combustion; a gas conduit tube connected to such chamber means; a jet nozzle therein; an enclosed water space surrounding said combustion and gas trapping spaces adapted to holding water under pressure in exposure to the heat of such combustion; a heat disseminator means; a conduit means leading from such gas conduit tube and connecting with such heat disseminator means; a conduit means leading from the lower part of the enclosures of such disseminator means and constituting means for the evacuation of such products; a receptacle containing water; a conduit means suitable for dripping water from such distributive and evacuative conduit means and connecting with the water receptacle; an operable pump; a conduit connecting the suction of such pump with such water receptacle; a conduit means connecting the discharge of such pump with the said water space surrounding furnace and gas trapping chamber; a conduit connecting said water space with said jet tube or nozzle in said gas conduit leading outward from such gas trapping chamber and adapted to the application of inductive and propulsive force to such trapped products of combustion and to their temperature reduction by conversion of some of the sensible heat thereof into latent heat of evaporation of water by means of passage of heat-laden water under pressure therethrough; an operable forcing fan means connected to conduit means comprising said distributive and evacuative conduit means, and adapted to imparting inductive and propulsive force to the gases moving through such connected conduit means; an electrically operable fuel valve located in such fuel supply conduit; a pilot light means comprising a pilot light burner and a pilot light service conduit connecting such pilot light burner with such fuel supply conduit between such electrically operable fuel valve and the source of fuel; a thermostat or other thermally operable means so located as to be affected by the heat dissipated by such heat disseminator means and capacitated to close such electrically operable fuel valve and stop such operable water pump and fan means when the temperature at such point attains to an elected level and to open such valve and operate such water pump and fan means when the temperature at such point drops to an elected level; and a power conductor means suitable for the integration of such electrically operable means.

5. A heating apparatus comprising elements enumerated in claim 1 and a throttle valve in the water conduit between said pump and said jet nozzle; an electably thermally-actuatable means located in the mixed gases conduit between such jet nozzle and such disseminator means and affected by the temperature of the gases therein; an articulating means connecting such throttling valve and thermally operable means and collectively capacitated to proportionally open such throttle valve to permit of passage therethrough of an increased amount of water when the temperature of such mixed gases exceeds an elected temperature and to proportionally close such throttling valve to reduce the amount of water passing therethrough when the temperature of such mixed gases falls below an elected temperature.

6. A heating apparatus comprising a fluid fuel supply conduit; an electrically operable fuel valve located in the fuel supply conduit, adapted to open by actuation of remotely situated thermostatic means; a fuel burner connected to such fuel supply conduit adapted to burning fluid fuel under atmospheric conditions; gas trapping means overhanging such burner and so disposed as to trap upwardly buoyed products of combustion therefrom; a gas outlet conduit leading outwardly from such gas trapping means; a jet nozzle in said outlet conduit; a conduit system connected with such gas outlet conduit comprising a main distributing conduit, a plurality of heat disseminators, gas exhausting means comprising an electrically operable force fan and a main exhausting conduit, branch distributing pipes connecting such main distributing conduit to said heat disseminators, branch exhaust pipes connecting said heat disseminators to said main exhausting conduit in parallel; a receptacle containing water; conduit means suitable for draining water from the distributive and exhaust mains into said water receptacle; an electrically operable water pump; a conduit connecting the suction of said pump with said receptacle; a conduit connecting the discharge of such pump with said jet nozzle located in the gas conduit leading outwardly from the gas trapping chamber whereby a propulsive effect is imparted to the gases flowing through the system; a plurality of electrically operated valve means in the conduit system arranged to control the flow of liquid through the respective heat disseminators; a corresponding number of thermostatic means so located as to be responsive to the heat emitted by the respective disseminators and adapted for closing an actuating electric circuit suitable for opening said fuel supply valve and said valve means in the conduit circuit thereof and for operating said force fan and pumping means when the temperature at such point drops below an elected level and for breaking such actuating electric circuit when the temperature at such point attains to an elected level; and means suitable for the integration of such electrically operable means.

7. A heating apparatus comprising the elements enumerated in claim 6 and a water throttle valve located in conduit connecting the discharge of pump with jet nozzle; an articulating means; a thermally actuatable means located in the mixed gases conduit between such jet nozzle and the first branch supply conduit and affected by the temperature of the gases therein and capacitated through articulation with said throttling valve in the pump discharge conduit to proportionally open such throttling valve to permit of passage therethrough of an increased amount of water when the temperature of such mixed gases exceeds an elected temperature and to proportionally close such throttling valve to reduce the amount of water passing therethrough when the temperature of such mixed gases falls below an elected temperature.

8. A heating apparatus comprising the elements enumerated in claim 1 and an aperture in the lower part of the wall of such combustion and gas trapping chamber in juxtaposition to the flame of combustion and adapted to dissipate radiant heat directly from combustion into the space within which the furnace is located.

9. A heating apparatus comprising a fuel supply conduit; a fuel burner connected thereto and adapted to burning fuel under atmospheric conditions; a gas trapping chamber means overhanging such burner and so disposed as to trap the upwardly buoyed products of combustion therefrom; a gas conduit tube connected to such chamber; a jet nozzle therein; a heat disseminator means; a supply conduit means and connecting with such heat disseminator means; an exhaust conduit means leading from such disseminator means and constituting means for evacuating such products of combustion; a receptacle containing water; a conduit means suitable for dripping water from such supply conduit means and exhaust conduit means and connecting with such water receptacle; an operable water pump; a conduit connecting the suction of such pump with such receptacle; a conduit connecting the discharge of such pump with said jet nozzle located in the gas conduit tube leading outward from the gas trapping chamber means and adaptable by discharge of water therethrough to the application of inductive and propulsive force to such products of combustion and to their temperature reduction by conversion of a part of their sensible heat into latent heat of evaporation; an operable forcing fan means connected to supply or exhaust conduit means, and adapted to imparting inductive and propulsive force to the gases moving through such connected system;

an electrically operable fuel valve located in such fuel supply conduit; a pilot light means comprising a pilot light burner and a pilot light service conduit connecting such pilot light burner with such fuel supply conduit between such electrically operable fuel valve and the source of fuel; and a thermostat or other thermally operable means so located as to be affected by the heat dissipated by such heat disseminator means and capacitated to close such electrically operable fuel valve and stop such operable water pump and forcing fan means when the temperature at such point attains to an elected level and to open such valve and operate such water pump and forcing fan means when the temperature at such point drops to an elected level; a power conductor means suitable for the integration of such electrically operable means; an aperture in the lower part of the wall of such combustion and gas trapping chamber means in juxtaposition to the flame of combustion and adapted to dissipate radiant heat directly from combustion into the open space within which the furnace is located; a cowl resting upon such primary gas trapping chamber and forming a secondary gas trapping chamber and having an outward and downward extending conduit terminating at the top of such aperture and adapted to capturing gases overflowing from the primary gas trapping chamber and conveying them into such secondary chamber; and a thermally actuatable means affected by the heat within such secondary chamber and capacitated to break the power means circuit holding in open position the electrically operated fuel valve and actuating the forcing fan means and water pumping means when the temperature in such secondary chamber attains to an elected level.

10. A heating apparatus comprising elements enumerated in claim 1 and a water pressure actuated gas valve set in the fuel service conduit and connected with the water pump discharge conduit capacitated to open such fuel valve against a normally closing tension by means of the diversion of some of the water pumped under pressure by such pump, into an expansible water chamber having a pressure operable member articulated with such fuel valve.

11. A heating apparatus comprising elements enumerated in claim 1 and a throttle valve in the water circuit between said pump and said jet; an electably thermally-actuatable means located in the mixed gases conduit between such water spray nozzle and the said heat disseminator means, and affected by the temperature of the gases therein; an articulating means connecting said throttling valve and thermally operable means and collectively capacitated to proportionally open such throttle valve to permit of passage therethrough of an increased amount of water when the temperature of such mixed gases exceeds an elected temperature and to proportionally close such throttling valve to reduce the amount of water passing therethrough when the temperature of such mixed gases falls below an elected temperature.

12. In a heating system comprising a fuel burner, means for trapping hot combustion products rising from said burner, an outlet conduit for said hot combustion gases communicating with said gas trapping means, a hot-gas distributing system communicating with said outlet conduit, including heat disseminating means; the improvement which comprises combined means for applying a propulsive force to the combustion gases and for reducing their temperature prior to reaching the heat disseminating means, said combined means including a jet nozzle for introducing water under pressure to the combustion gas outlet conduit in their direction of flow, water supply means communicating with said jet nozzle, pumping means for applying pressure to said water supply means, and means for draining water of condensation from said gas distributing system to said water supply means.

13. In a heating system comprising a fuel burner, means for trapping hot combustion products rising from said burner, an outlet conduit for said hot combustion gases communicating with said gas trapping means, a hot-gas distributing system communicating with said outlet conduit, including heat disseminating means; the improvement which comprises combined means for applying a propulsive force to the combustion gases and for reducing their temperature prior to reaching the heat disseminating means, said combined means including a jet nozzle for introducing water under pressure to the combustion gas outlet conduit in their direction of flow, water supply means communicating with said jet nozzle, pumping means for applying pressure to said water supply means, means for draining water of condensation from said gas distributing system to said water supply means, and thermostatic means for controlling the water pumping means in accordance with the quantity of heat emitted by said heat disseminating means.

14. In a heating system comprising a fuel burner, means for trapping hot combustion products rising from said burner, an outlet conduit for said hot combustion gases communicating with said gas trapping means, a hot-gas distributing system communicating with said outlet conduit, including heat disseminating means; the improvement which comprises combined means for applying a propulsive force to the combustion gases and for reducing their temperature prior to reaching the heat disseminating means, said combined means including a jet nozzle for introducing water under pressure to the combustion gas outlet conduit in their direction of flow, water supply means communicating with said jet nozzle, pumping means for applying pressure to said water supply means, means for draining water of condensation from said gas distributing system to said water supply means, a fuel supply conduit, a control valve in said conduit, and thermostatic means actuated in accordance with the quantity of heat emitted by said heat disseminating means for controlling said valve and said water pumping means.

15. A heating system as set forth in claim 12 wherein the heat disseminating means comprises a plurality of heat disseminators connected in parallel in said distributing system, and thermostatic means associated with each of said disseminators for controlling the operation of the water pump in accordance with the quantity of heat emitted by the respective heat disseminators.

16. A heating apparatus comprising a fuel supply conduit; a fuel burner connected thereto and adapted to burning fuel under atmospheric conditions; a gas trapping chamber means overhanging such burner and so disposed as to trap the upwardly buoyed products of combustion therefrom; a gas conduit tube connected to such chamber means; a jet nozzle therein; a heat disseminator means; a conduit means leading from such gas conduit tube and connecting with such heat disseminator means; a conduit means leading from the enclosure of such disseminator means and adapted to evacuating the unused part of such products of combustion; a receptacle containing water; a conduit means suitable for dripping water from such combustion gas conduit means and connecting with such water receptacle at an appropriate distance below water lever therein; an operable water pump; a conduit connecting the suction of such pump with such receptacle; a conduit connecting the discharge of such pump with said jet nozzle located in the gas conduit tube leading outward from the gas trapping chamber means and adaptable by discharge of water therethrough, to the application of inductive and propulsive force to such products of combustion and to their temperature reduction by conversion of a part of their sensible heat into latent heat of evaporation; an operable forcing fan means connected to combustion gas conduit means, and adapted to imparting inductive and propulsive force to the gases moving through such connected system; and a throttle valve in the water conduit between said pump and said jet nozzle; an electably thermally-actuatable means located in the mixed gases conduit between such jet nozzle and such disseminator means and affected by the temperature of the gases therein; an articulating means connecting such throttling valve and thermally operable means and collectively capacitated to proportionally open such throttle valve to permit of passage therethrough of an increased amount of water when the temperature of such mixed gases exceeds an elected temperature and to proportionately close such throttling valve to reduce the amount of water passing therethrough when the temperature of such mixed gases falls below an elected temperature.

17. A heating apparatus comprising a fuel supply conduit; a fuel burner connected thereto and adapted to burning fuel under atmospheric conditions; a gas trapping chamber means overhanging such burner and so disposed as to trap the upwardly buoyed products of combustion therefrom; a gas conduit tube connected to such chamber means; a jet nozzle therein; a heat disseminator means; a conduit means leading from such gas conduit tube and connecting with such heat disseminator means; a conduit means leading from the enclosure of such disseminator means and adapted to evacuating the unused part of such products of combustion; a receptacle containing water; a conduit means suitable for dripping water from such combustion gas conduit means and connecting with such water receptacle at an appropriate distance below water level therein; an operable water pump; a conduit connecting the suction of such pump with such receptacle; a conduit connecting the discharge of such pump with said jet nozzle located in the gas conduit tube leading outward from the gas trapping chamber means and adaptable by discharge of water therethrough, to the application of inductive and propulsive force to such products of combustion and to their temperture reduction by conversion of a part of their sensible heat into latent heat of evaporation; an operable forcing fan means connected to combustion gas conduit means, and adapted to imparting inductive and propulsive force to the gases moving through such connected system; and an aperture in the lower part of the wall of such combustion and gas trapping chamber in juxtaposition to the flame of combustion and adapted to dissipate radiant heat directly from combustion into the space within which the furnace is located.

18. A method for the production and distribution of a heating medium through a heat disseminating system, which comprises introducing fuel and atmospheric air to a combustion zone, burning the fuel at said combustion zone to produce combustion gases, tempering said gases and circulating the gases through the system by spraying water under pressure directly to the hot gases in the direction of flow of the gases, whereby the water is vaporized and mixed with the gases to provide a circulating heating medium having a temperature suitable for utilization in the disseminating system, and then withdrawing from the disseminating system any water of condensation resulting from the cooling of the heating medium, and returning the water of condensation to the hot combustion gases under pressure.

19. A method for the production and distribution of a heating medium through a heat disseminating system, which comprises introducing fuel and atmospheric air to a combustion zone, burning the fuel at said combustion zone to produce combustion gases, tempering said gases and circulating the gases through the system by spraying water under pressure directly to the hot gases in the direction of flow of the gases, whereby the water is vaporized and mixed with the gases to provide a circulating heating medium having a temperature suitable for utilization in the disseminating system, and then withdrawing from the disseminating system any water of condensation resulting from the cooling of the heating medium, returning the water of condensation to the hot combustion gases under pressure, and regulating the quantity of fuel burned and the pressure of the water introduced into the system in accordance with the temperature at a given point adjacent the disseminating system remote from the combustion zone.

20. A method of heating consisting of burning fuel in heat exchange relation to a space designed to be heated, radiating directly into such space some of the heat produced by such combustion, arresting and confining the heated waste gases of such combustion, exposing such confined gases to water in the form of spray to convert a part of their sensible heat into latent heat of water vapor and to mingle such gases and water vapor to form a medium suitable for the conveyance of the contained heat to remote places, confinedly conducting such medium to remote spaces designed to be heated, radiating heat from such confined heating medium through heat conducting walls into such spaces designed to be heated and confinedly evacuating the residue of such heating medium to the outside atmosphere.

21. A method of heating consisting of the processes enumerated in claim 20 and electively proportioning the total heat produced by such combustion, between that which it is desirable to radiate directly from the combustion into the surrounding space and that which it is desirable to use to form a heating medium for service in remote spaces.

22. A method of heating consisting of the processes enumerated in claim 20 and automatically controlling all such processes by the effects induced by temperature in a space so heated.

23. A method of heating consisting of: delivering fuel to a combustion zone by means of fuel source pressure; initiating combustion; supplying combustion-supporting air by means of thermal motivation incident to such combustion; leading the resultant products of combustion into a gas trapping zone by means of thermal motivation incident to such combustion; injecting such gases into a conduit connecting therewith, reducing their temperature by converting some of the sensible heat thereof into latent heat of evaporation of water by spraying water under pressure directly to the gases, mixing such water vapor with such products of combustion, propelling such mixture through a connected system of distributing conduits, heat emittive facilities and evacuative conduits by means of the pressure of the stream of water, and dissipating heat by means of such heat emittive facilities.

24. A method of heating consisting of: burning fuel under atmospheric conditions; leading the products of such combustion by means of thermal motivation into a gas trapping zone; moving such gases thence through a connected distributive, heat disseminative and gas evacuative system; lowering the temperature of such gases by conversion of some part of their sensible heat into latent heat of evaporation and mixing such gases with such water vapor by spraying water under pressure into the conduit by which such products are led from such gas trapping zone; and dissipating heat from said disseminating system.

25. A method of heating consisting of: burning fuel under atmospheric conditions, in which fuel is delivered to the combustion zone under pressure and air is supplied by thermal motivation incident to such combustion; leading the resultant products of combustion by means of such thermal motivation into a gas trapping zone; moving such gases through connected distributive, heat disseminative and evacuative zones; applying inductive and propulsive force to such gases, lowering their temperature by conversion of some of the sensible heat thereof into latent heat of evaporation and mixing such gases with such water vapor, by spraying water under pressure into the stream of such gases in the direction of their induced flow; and dissipating heat from said heat disseminating zone.

26. A method of heating consisting of: delivering fuel to a fuel combustion zone by means of normal fuel service pressure; initiating combustion of said zone; supplying combustion air by means of thermally motivating ambient air by such combustion; effecting movement of the products of such combustion into a combustion gas trapping zone by the thermal motivation of such gases incident to such combustion; trapping such gases; thermodynamically impressing water by spraying it under pressure through conduits composed of heat conducting material in exposure to the heat of such combustion; injecting such trapped gases into a communicating conduit, reducing their temperature therein by converting some of the sensible heat thereof into latent heat of water evaporation, mixing such products of combustion with such evaporated water and propelling such gas mixture through connected distributive, heat disseminative and gas evacuative zones by means of the discharge of such thermodynamically conditioned water into the conduit connecting such gas trapping zone with such distributive, heat disseminative and gas evacuative zones; and dissipating heat from said disseminative zone.

27. A method of heating consisting of: delivering fuel to a fuel combustion zone by means of normal fuel service pressure; initiating combustion; supplying combustion air by means of thermally motivating ambient air by such combustion; effecting movement of the products of such combustion into a combustion gas trapping zone by the thermal motivation of such gases incident to such combustion; trapping such gases; thermodynamically impressing water by spraying it under pressure through conduits composed of heat conducting material in exposure to the heat of such combustion; inducing such gases into a communicating conduit by application of pressure; reducing the temperature of such gases therein by converting some of the sensible heat thereof into latent heat of water evaporation and mixing such products of combustion with such evaporated water by means of the discharge of such thermodynamically conditioned water into such gases within such conduit; moving such gas mixture thence through a connected system of distributing, heat disseminating and evacuating zones; and dissipating heat from said disseminating zone.

28. A method of heating consisting of: delivering fuel to a fuel combustion zone by means of normal fuel service pressure; initiating combustion; supplying combustion air by means of thermally motivating ambient air by such combustion; effecting movement of the products of such combustion into a combustion gas trapping chamber by the thermal motivation of such gases incident to such combustion; trapping such gases; thermodynamically impressing water by spraying it under pressure through conduits composed of heat conducting material in exposure to the heat of such combustion; contributing to the induction of such trapped gases into a communicating conduit, reducing their temperature therein by converting some of the sensible heat thereof into latent heat of water evaporation, mixing such products of combustion with such evaporated water and applying propulsive force to such gas mixture to facilitate their movement through a connected distributive, heat disseminative and gas evacuative zones by means of the discharge of such thermodynamically conditioned water into said conduit; requisitely supplementing such inductive and propulsive jet force by means of inductive and propulsive force applied within the distributive, disseminative and evacuative circuit; and dissipating heat from said disseminating zone.

29. A method of heating comprising the operations enumerated in claim 23; and stopping such processes of combustion, gas trapping, water spraying, gas cooling, gas circulation, heat dissipation and gas evacuation when the temperature at a point affected by heat emitted from such heat disseminative zone attains to an elected level and re-establishing each such process when the temperature at such place drops to an elected level.

30. A method of heating consisting of: introducing the products of combustion into a mixing zone; electably lowering their temperature by spraying thereinto such an electable quantity of water as will result in a mixture of gases having a temperature of such elected level; moving such gases from such mixing zone into and through communicating distributive, heat disseminative and evacuative zones by means of pressure disparity between the point of entrance of such gases thereinto and the point of discharge of such gases from such evacuative means derived by application to such gases, intermediate such points, of force derived from external power;

and dissipating heat from such heat disseminating zone.

31. A method of heating consisting of: introducing the products of atmospheric combustion into a mixing zone; electably lowering their temperature by spraying thereinto such a quantity of water as will result in a mixed gases temperature of such elected level; moving the resultant gas mixture through communicating distributive, heat disseminative and evacuative zones by means of pressure disparity between the point of entrance of such gases into such mixing zone and the point of discharge of such gases from such evacuative means effected by application of motive force to such gases between such two points; and dissipating heat from such heat disseminating zone.

32. A method of heating consisting of: delivering fuel to a fuel combustion zone by means of fuel source pressure; initiating combustion at said combustion zone; supplying combustion sustaining air thereto and moving the products of combustion therefrom into a gas trapping zone by means of thermodynamic impulses incident to such combustion; trapping such products of combustion in such gas trapping zone by means of specific gravity differential; conducting such products of combustion thence through a connected conduit circuit composed of supply conduits, heat disseminating means and evacuating conduits and evacuating such products of combustion therefrom by means of external power applied inductively and propulsively to such products within such circuit between the point of entrance of such products thereinto and the point of their evacuation; reducing the temperature of such products of combustion in transit through such conduit circuit by means of spraying water into the stream thereof adjacent the point of their entrance thereinto; and dissipating heat by means of such heat disseminators.

33. A method of heating consisting of: delivering fuel to a combustion zone by means of fuel source pressure; initiating combustion at said zone; supplying combustion-sustaining air thereto and moving the products of combustion therefrom into a gas trapping zone by means of the thermodynamic impulses incident to such combustion; trapping such products of combustion in such gas trapping zone by means of specific gravity differential; conducting such products of combustion thence through a connected circuit including supply conduits, heat disseminating zones and evacuating conduits and evacuating such products of combustion therefrom by means of external power applied inductively and propulsively to such products within such circuit between the point of entrance of such products thereinto and the point of their evacuation; reducing the temperature of such products of combustion in transit through such conduit circuit by means of spraying water into the stream thereof adjacent the point of their entrance thereinto and dissipating heat by means of such heat disseminators; and stopping such process of combustion, gas trapping, water spraying, gas cooling, gas circulation, heat dissipation, and gas evacuation when the temperature at a place affected by heat emitted from such heat disseminative zone attains to an elected level and re-establishing each such process when the temperature at such place drops to an elected level.

34. A method of heating consisting of: introducing the products of combustion into a mixing zone; electably lowering their temperature by spraying thereinto such an electable quantity of water as will result in a mixture of gases having a temperature of such elected level by means of thermal motivation of thermally operable means derived from the heat of such mixed gases in such chamber and articulated with and acting electably upon a throttle in such spray water service; moving such gases from such mixing zone into and through a communicating distributive, heat disseminative and evacuative zones by means of pressure disparity between the point of entrance of such gases thereinto and the point of discharge of such gases from such evacuated means derived by application to such gases, intermediate such points, of force derived from external power; and dissipating heat at such heat disseminating zones.

35. A method of heating comprised of burning fuel atmospherically, trapping the products of its combustion, reducing the temperature of such products by converting some of their sensible heat into latent heat of water vapor, mixing such products and sprayed water to form a heating medium and moving such heating medium through one or other or several of a multiplicity of heat disseminating means connected in parallel with such heating medium source, in electable accordance with the respective heat effects within each of the several spaces in which such multiplicity of heat disseminating means are situated.

36. A method of heating comprising electable, thermally induced actuation in one or other or several concurrently of a plurality of spaces each appointed with heat disseminating means communicably connected with a source of heating medium, of the processes of atmospheric combustion of fuel, trapping the products thereof, exposing such products to sprayed water to convert part of their sensible heat into latent heat of water vapor and to mix them with such water vapor thus forming such heating medium source, confinedly moving such medium from such source into such respective heat disseminating means and disseminating heat into such spaces respectively.

37. A method of heating comprised of supplying a heating medium composed of products of combustion mixed with water vapor to the individual respective components of a plurality of heat disseminating means connected in parallel with a source of heating medium composed of products of combustion and water vapor by opening valve means in the supply conduits to such respective disseminating means and simultaneously supplying actuating impulses appropriate to burning fuel atmospherically, capturing the products of such combustion, lowering the temperature of such products by spraying water thereinto to convert some of their sensible heat into latent heat of water vapor and to form a heating medium composed of a mixture of such products and water vapor, forcing such heating medium from such heating medium source through such open valved supply conduit means into such heat disseminating means when the temperature in each of the respective spaces in which such plurality of heat disseminating means are effectively located attains to an electable level and closing such supply valve means and stopping such actuation of generation and forced circulation of such heating medium when the temperature in each of such respective spaces falls to electable levels.

JOHN H. VAN ZANDT.